United States Patent Office 2,825,654
Patented Mar. 4, 1958

2,825,654
MEAT TENDERIZER

Edwin A. Vaupel, Dallas, Tex., assignor to Food Industries Company, Inc., Dallas, Tex.

No Drawing. Application May 5, 1955
Serial No. 506,350

1 Claim. (Cl. 99—222)

The present invention relates to a new and improved meat or food tenderizer composition, and more particularly to the provision of a new food or meat tenderizing composition which is free flowing under any climatic conditions.

Heretofore it has been impossible to properly blend together an extremely fine powdery and lightweight material together with a dry granular carrier such as salt. It has been proposed to replace a part of the salt with starch or similar material but this is not suitable for a food tenderizer since the starch is not soluble and a very dustry product results.

The present invention on the other hand, seeks to provide a meat tenderizing composition which is free flowing at all times, which is soluble in water and in a granular physical form.

To the accomplishment of the foregoing and related ends, the invention, then comprises the features hereinafter fully described, and particularly pointed out in the claims, the following description setting forth in detail certain illustrative embodiments of the invention, these being indicative however of but a few of the various ways in which the principle of the invention may be employed.

It has now been found, in accordance with the present invention, that a light fine powdery enzyme material can be blended with a more dense granular material such as sodium chloride or table salt by coating the salt with fluid or plastic substances so that a uniform granular product will be produced and wherein the ingredients will not separate so that there will be no loss of material in handling.

The meat or food tenderizer of the present invention contains the following ingredients. Fungal protease or enzyme which is in a fine powdered form, salt in granular form, dextrose in granular form, monosodium glutamate in granular form, pepper in granular form, celery salt in granular form, and fluid which may be of vegetable or mineral derivation.

It has been found or noted that a meat tenderizer should be soluble in water and in a granular physical form so that the meat tenderizer can be readily sprinkled on the meat easily and uniformly. The tenderizer composition must be soluble so that it will not streak and so that the meat will not be given an undesirable appearance. The table salt or sodium chloride has been found to be the best and most economical carrier for the enzyme.

In its natural form, the enzyme material is an extremely fine powdery and lightweight material and this enzyme material will not blend with the dry granular salt and stay uniformly blended due to this physical condition. In the event that a sizeable portion of the salt is replaced with starch or a similar material, then the enzyme probably could be blended into the product satisfactorily, but the starch is not soluble in the water and therefore gives a very dusty product. Thus, in the present invention a small amount of oil or fat is used and this oil or fat is a very essential part of the present invention. Thus, a part or all of the granular salt is coated with a small amount of the oil, fat, or other compatible fluid or plastic material. Then, when the fine dusty enzyme material is mixed in, the enzyme will cling to the oil coated salt granules so that the enzyme will be prevented from separating or shaking out from the granular salt and other ingredients.

The meat tenderizer of the present invention further utilizes or includes a small amount of dextrose or sugar which forms part of the carrier for the enzyme and the sugar is completely soluble in water and blends readily with the salt. The sugar also tends to dilute and prevent the possibility of using too much salt on the meat from a taste standpoint.

The small amount of monosodium glutamate is used to improve the flavor of the product and pepper and celery salt are added in small quantities to give the product a desirable aroma.

The method of blending used with the present invention may be used to blend ingredients or products wherever a problem is encountered in blending a light fine powdery material with a more dense granular material. Thus, by using the blending method of the present invention, there results a uniform granular product in which the ingredients will not separate and whereby there will be no dust and loss of material in handling.

The tenderizer composition of the present invention will make meats, fowl, fish, and other protein foods more tender as far as eating quality is concerned. This tenderizing process is brought about by means of the active fungal protease enzyme which acts directly upon the proteins in the meat and partially breaks down the proteins. This enzyme action is destroyed by heat when the meat is cooked.

As an example of the relative proportions of the ingredients that can be used in making the food tenderizing composition, the following is given: enzyme 5%, monosodium glutamate 2%, dextrose 15%, white pepper .125%, celery salt .125%, sodium chloride 77% and vegetable or mineral oil .75%.

The food tenderizer composition may be tinted or dyed to identify the same on the market and to differentiate the same over ordinary white table salt. Thus, the composition may be tinted or dyed with any number of physiologically harmless vegetable dyes such as those listed in the Department of Agriculture Bulletin No. 448. As red coloring dyes, Scarlet Red, Magenta Red, Cherry Red, China Red, Christmas Red, Palatine Scarlet, or Congo Red may be employed. As green coloring dyes, one may employ Wool Green, Naphthol Green B, or Night Green 2B. For a yellow tint, one could employ Brilliant Yellow, Naphthol Yellow S, or Sun Yellow, and for a blue tint Patent Blue, Methylene Blue, or Soluble Blue may be employed. The table salt enzyme mixture may be tinted by spraying thereon a fine mist of a dilute solution of any of the foregoing dyestuffs. The dilute solution may be alcoholic or other edible solvents which are free of water.

On each grain of salt there is a microscopic film or envelope of oil which retains the powdery enzyme thereon.

Thus, it will be seen that there has been provided a dry powdered meat or food tenderizer which contains fats or oils whereby the enzyme is held uniformly dispersed throughout the preparation. A small amount of oil or fat serves to coat the salt granules so that the dusty enzyme material clings to the oil coated salt granule. The main purpose of using the oil in the present invention is to fix or hold the enzyme uniformly in a dry granular or powdered preparation and only a small amount of approximately .1% to 5% is needed in the granular meat tenderizer. Thus, the composition herein described is such that the powdered enzyme material which is fine, and light in weight, is physically fixed or stabilized in a dry powdered or granular preparation with other heavy dry ingredients so that it stays uniformly dispersed throughout the preparation. This is accomplished by means of a small amount of oil, fat or other compatible fluid or plastic which causes the light enzyme material to adhere to the other ingredients in the composition. The fat, oil or other fluid also prevents dust when blending the preparation.

The samples and modifications included herein are merely illustrative and it will be understood of course, that the invention is to be taken and limited only by the scope of the appended claim.

It is to be understood that while oil may be used to coat the salt granules, nevertheless any suitable fluid or plastic material can be used in place of oil. In other words, it is to be specifically understood that the present invention is not restricted to the use of oil since any suitable fluid or plastic material may be utilized.

If desired, a fat may be used, and such fat may be considered a plastic material.

What is claimed is:

A free flowing food tenderizing composition comprising a mixture of 5% fungal enzyme, 77% sodium chloride, 15% dextrose, 2% monosodium glutamate, .125% pepper, .125% celery salt, and .75% edible oil, said fungal enzyme being in fine granular form, the sodium chloride, dextrose, monosodium glutamate, pepper and celery salt being in granular form.

References Cited in the file of this patent
UNITED STATES PATENTS

| | | |
|---|---|---|
| 2,046,862 | Allen | July 7, 1936 |
| 2,054,626 | Griffith | Sept. 15, 1936 |
| 2,140,781 | Allen | Dec. 20, 1938 |
| 2,221,689 | Jensen | Nov. 12, 1940 |
| 2,553,533 | Komarik et al. | May 15, 1951 |
| 2,634,212 | Komarik | Apr. 7, 1953 |
| 2,687,356 | Fraticelli | Aug. 24, 1954 |

OTHER REFERENCES

"The Chemistry and Technology of Enzymes," 1949, by Henry Tauber, published by John Wiley and Sons, Inc., New York, page 401.